US011683227B2

United States Patent
Naik et al.

(10) Patent No.: US 11,683,227 B2
(45) Date of Patent: Jun. 20, 2023

(54) STREAMING AND CONFIG FOR EVENT DRIVEN MICROSERVICE ARCHITECTURE FOR EMBEDDED SERVICES

(71) Applicant: Infinera Corp., San Jose, CA (US)

(72) Inventors: Dharmendra Naik, San Jose, CA (US); Yatindra Chugh, Sunnyvale, CA (US); Gilbert Levesque, Palo Alto, CA (US); Bryce Edwards, Sunnyvale, CA (US); Prashaanth Ragupathy, San Francisco, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/840,862

(22) Filed: Jun. 15, 2022

(65) Prior Publication Data

US 2022/0400052 A1    Dec. 15, 2022

Related U.S. Application Data

(60) Provisional application No. 63/210,532, filed on Jun. 15, 2021.

(51) Int. Cl.
*G06F 15/177* (2006.01)
*H04L 41/0816* (2022.01)

(52) U.S. Cl.
CPC ................ *H04L 41/0816* (2013.01)

(58) Field of Classification Search
None
See application file for complete search history.

(56) References Cited

U.S. PATENT DOCUMENTS

| 2016/0124742 A1* | 5/2016 | Rangasamy | G06F 8/30 717/103 |
| 2016/0248861 A1* | 8/2016 | Lawson | H04L 12/14 |
| 2018/0069806 A1* | 3/2018 | Kumar | H04L 47/827 |
| 2020/0288309 A1* | 9/2020 | Tran | H04L 65/1073 |
| 2022/0350679 A1* | 11/2022 | Sukhomlinov | G06F 9/5072 |
| 2022/0398081 A1* | 12/2022 | Ragupathy | G06F 8/63 |

* cited by examiner

*Primary Examiner* — Atta Khan
(74) *Attorney, Agent, or Firm* — David L. Soltz (57) ABSTRACT

A network element is herein disclosed. The network element comprises an embedded device having one or more property affecting a function of the embedded device and one or more status; a first computing system having a first processor and a first memory, the first memory being a first non-transitory computer-readable medium storing a device microservice and a hardware entity microservice, the hardware entity microservice in communication with the embedded device; a second computing system having a second processor and a second memory, the second memory being a second non-transitory computer-readable medium storing a core framework microservice; and a communication device in communication with the first computing system and the second computing system.

18 Claims, 4 Drawing Sheets

STREAMING AND CONFIG FOR EVENT DRIVEN MICROSERVICE ARCHITECTURE FOR EMBEDDED SERVICES

CROSS REFERENCE TO RELATED APPLICATION

This application claims the benefit of U.S. Provisional Patent Application No. 63/210,532, filed on Jun. 15, 2021, the entire content of which is hereby incorporated herein by reference in its entirety.

BACKGROUND

Optical communication systems typically include a first node that supplies optical signals carrying user information or data to a second node that receives such optical signals via an optical communication path that connects the first node to the second node. In certain optical communication systems, the first node is a so-called hub node that communicates with a plurality of second nodes, also referred to as leaf nodes. The optical communication paths that connect the hub with multiple leaf nodes may include one or more segments of optical fiber connected to one another by various optical components or sub-systems, such as optical amplifiers, optical splitters and combiners, optical multiplexers and demultiplexers, and optical switches, for example, wavelength selective switches (WSS). The optical communication path and its associated components may be referred to as a line system.

In each node, the various optical components or sub-systems and the various electrical components and subsystems need to be configured as determined by user needs and communication requirements. Additionally, because the various components in each node operate in a constrained resource environment as an edge class device, traditional methods of configuring services exceed resource constraints or require firmware or other operating software to be recompiled specifically for each computing device in the node, which is both a resource demanding process and a lengthy process to execute each time any configuration change is needed.

Therefore, a need exists for systems and methods for loosely coupling services in resource constrained environments while ensuring context between services. It is to such a system and method that the present disclosure is directed.

SUMMARY

The problem of loosely coupling services in resource constrained environments while ensuring context between services is solved by a network element comprising an embedded device having one or more property affecting a function of the embedded device and one or more status; a first computing system having a first processor and a first memory, the first memory being a first non-transitory computer-readable medium storing a device microservice and a hardware entity microservice, the hardware entity microservice in communication with the embedded device; a second computing system having a second processor and a second memory, the second memory being a second non-transitory computer-readable medium storing a core framework microservice; and a communication device in communication with the first computing system and the second computing system.

Implementations of the above techniques include methods, apparatus, systems, and computer program products. One such computer program product is suitably embodied in a non-transitory computer-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, e.g., by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable mediums may include random access memory (RAM), a read only memory (ROM), a CD-ROM, a hard drive, a solid-state drive, a flash drive, a memory card, a DVD-ROM, a BluRay Disk, a disk, an optical drive, combinations thereof, and/or the like.

Such non-transitory computer-readable mediums may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical lightpath. For example, an optical route may specify a path along which light is carried between two or more network entities.

Users of optical networks may want to determine information associated with the optical network. Optical network information may be difficult to obtain, aggregate, and display. Implementations described herein assist a user in obtaining and viewing aggregated optical network information, such as network information associated with network entities and optical links between the network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Figure 1:
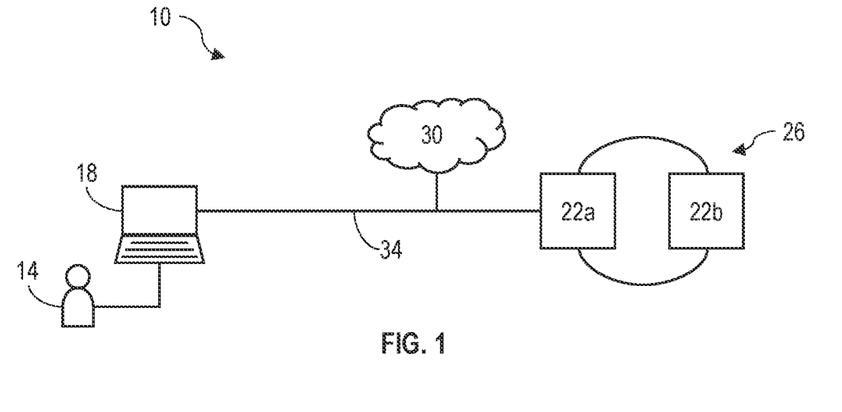
FIG. 1 is a diagrammatic view of an exemplary embodiment of hardware forming a system for uniform management of distributed microservices constructed in accordance with the present disclosure.

Referring now to the drawings, and in particular to FIG. 1, shown therein is a diagram of an exemplary embodiment of a system 10 for uniform management of distributed microservices constructed in accordance with the present disclosure. A user 14 may interact with the system 10 using a user device 18 that may be used to send a configuration to one or more network element 22, such as a first node 22a and/or a second node 22b of an optical network 26. The user device 18 may communicate with the optical network 26 and/or a cloud-based server 30 via a network 34.

In some embodiments, the cloud-based server 30 may comprise a processor and a memory having a data lake that may store copies of data such as sensor data, system data, metrics, logs, tracing, etc. in a raw format as well as transformed data that may be used for tasks such as reporting, visualization, analytics etc. The data lake may include structured data from relational databases, semi-structured data, unstructured data, time-series data, and binary data. The data lake may be a data base, a remote accessible storage, or a distributed file system.

In some embodiments, the network 34 may be the Internet and/or other network. For example, if the network 34 is the Internet, a primary user interface of the system 10 may be delivered through a series of web pages or private internal web pages of a company or corporation, which may be written in hypertext markup language, and accessible by the user device 18. It should be noted that the primary user interface of the system 10 may be another type of interface including, but not limited to, a Windows-based application, a tablet-based application, a mobile web interface, an application running on a mobile device, and/or the like.

The network 34 may be almost any type of network. For example, in some embodiments, the network 34 may be a version of an Internet network (e.g., exist in a TCP/IP-based network). In one embodiment, the network 34 is the Internet. It should be noted, however, that the network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

Optical network 26 may include any type of network that uses light as a transmission medium. For example, optical network 26 may include a fiber-optic based network, an optical transport network, a light-emitting diode network, a laser diode network, an infrared network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination thereof.

Figure 2:
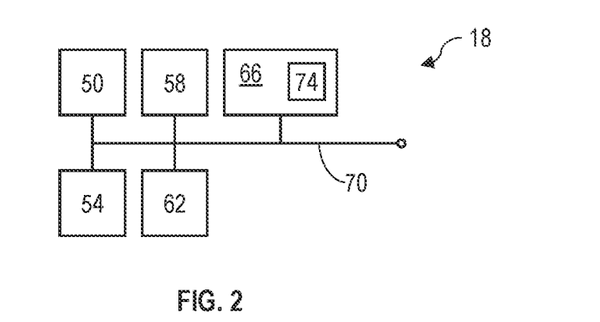
FIG. 2 is a diagrammatic view of an exemplary embodiment of a user device for use in the system of FIG. 1.

Referring now to FIG. 2, shown therein is a diagram of an exemplary embodiment of the user device 18 of the system 10 constructed in accordance with the present disclosure. In some embodiments, the user device 18 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the user device 18 may include one or more input device 50 (hereinafter "input device 50"), one or more output device 54 (hereinafter "output device 54"), one or more processor 58 (hereinafter "processor 58"), one or more communication device 62 (hereinafter "communication device 62") capable of interfacing with the network 34, one or more non-transitory computer-readable memory 66 (hereinafter "memory 66") storing processor-executable code and/or software application(s), for example including, a web browser capable of accessing a website and/or communicating information and/or data over a wireless or wired network (e.g., the network 34), and/or the like. The input device 50, output device 54, processor 58, communication device 62, and memory 66 may be connected via a path 70 such as a data bus that permits communication among the components of user device 18.

The memory 66 may store an application 74 that, when executed by the processor 58 causes the user device 18 to perform an action such as communicate with or control one or more component of the user device 18 and/or the network 34.

The input device 50 may be capable of receiving information input from the user 14 and/or processor 58, and transmitting such information to other components of the user device 18 and/or the network 34. The input device 50 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 54 may be capable of outputting information in a form perceivable by the user 14 and/or processor 58. For example, implementations of the output device 54 may include, but are not limited to, a computer monitor, a screen, a touchscreen, a speaker, a website, a television set, a smart phone, a PDA, a cell phone, a fax machine, a printer, a laptop computer, a haptic feedback generator, combinations thereof, and the like, for example. It is to be understood that in some exemplary embodiments, the input device 50 and the output device 54 may be implemented as a single device, such as, for example, a touchscreen of a computer, a tablet, or a smartphone. It is to be further understood that as used herein the term user (e.g., the user 14) is not limited to a human being, and may comprise a computer, a server, a website, a processor, a network interface, a user terminal, a virtual computer, combinations thereof, and/or the like, for example.

The network 34 may permit bi-directional communication of information and/or data between the user device 18, the cloud-based server 30, and/or the network element 20. The network 34 may interface with the cloud-based server 30, the user device 18, and/or the network element 20 in a variety of ways. For example, in some embodiments, the network 34 may interface by optical and/or electronic interfaces, and/or may use a plurality of network topographies and/or protocols including, but not limited to, Ethernet, TCP/IP, circuit switched path, combinations thereof, and/or the like. The network 34 may utilize a variety of network protocols to permit bi-directional interface and/or communication of data and/or information between the cloud-based server 30, the user device 18 and/or the network element 20.

Figure 3:
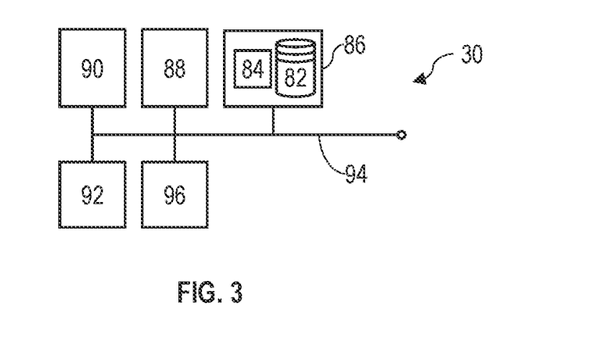
FIG. 3 is a diagrammatic view of an exemplary embodiment of a cloud-based server for use in the system of FIG. 1.

Referring now to FIG. 3, shown therein is a diagram of an exemplary embodiment of cloud-based server 30 constructed in accordance with the present disclosure. The cloud-based server 30 may include one or more devices that execute one or more microservice in a manner described herein. In the illustrated embodiment, the cloud-based server 30 is provided with one or more database 82 (hereinafter "database 82"), cloud server software 84, and one or more processor 88 (hereinafter "processor 88"). The cloud server software 84 and the database 82 are stored on a non-transitory computer-readable storage memory 86 (hereinafter "memory 86") accessible by the processor 88 of the cloud-based server 30. In some embodiments, the database 82 may be a time series database. The database 82 may be a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 82 can be centralized or distributed across multiple systems. In some embodiments, the cloud server software 84 may include one or more microservice 140 (discussed below in more detail). As used herein, any microservice 140 stored in the memory 86 and being executed by the processor 88 may be referred to as a cloud-level service or a high-level service.

In some embodiments, the cloud-based server 30 may comprise one or more processor 88 working together, or independently to, execute processor-executable code, such as the cloud server software 84, stored on the memory 86.

Additionally, each cloud-based server 30 may include at least one input device 90 (hereinafter "input device 90") and at least one output device 92 (hereinafter "output device 92"). Each element of the cloud-based server 30 may be partially or completely network-based or cloud-based, and may or may not be located in a single physical location.

The processor 88 may be implemented as a single processor or multiple processors working together, or independently, to execute the cloud server software 84 as described herein. It is to be understood, that in certain embodiments using more than one processor 88, the processors 88 may be located remotely from one another, located in the same location, or comprising a unitary multi-core processor. The processors 88 may be capable of reading and/or executing processor-executable code and/or capable of creating, manipulating, retrieving, altering, and/or storing data structures into the memory 86.

Exemplary embodiments of the processor 88 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 88 may be capable of communicating with the memory 86 via a path 94 (e.g., data bus). The processor 88 may be capable of communicating with the input device 90 and/or the output device 92.

The processor 88 may be further capable of interfacing and/or communicating with the user device 18 and/or the network elements 22 via the network 34 using a communication device 96. For example, the processor 88 may be capable of communicating via the network 34 by exchanging signals (e.g., analog, digital, optical, and/or the like) via one or more ports (e.g., physical or virtual ports) using a network protocol to provide updated information to the application 74 executed on the user device 18.

The memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the cloud-based server 30, and/or one or more memory 86 may be located remotely from the cloud-based server 30. For example, the memory 86 may be located remotely from the cloud-based server 30 and communicate with the processor 88 via the network 34. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer-readable storage memory (i.e., one or more memory 86 may be partially or completely based on or accessed using the network 34).

The input device 90 of the cloud-based server 30 may transmit data to the processor 88 and may be similar to the input device 50 of the user device 18. The input device 90 may be located in the same physical location as the processor 88, or located remotely and/or partially or completely network-based. The output device 92 of the cloud-based server 30 may transmit information from the processor 88 to the user 12, and may be similar to the output device 54 of the user device 18. The output device 92 may be located with the processor 88, or located remotely and/or partially or completely network-based.

The memory 86 may store processor-executable code and/or information comprising the database 82 and cloud server software 84. In some embodiments, the cloud server software 84 may be stored as a data structure, such as the database 82 and/or data table, for example, or in non-data structure format such as in a non-compiled text file.

Network elements 22 may include one or more devices that gather, process, store, and/or provide information in response to a request in a manner described herein. For example, Network elements 22 may include one or more optical data processing and/or traffic transfer devices, such as an optical node, an optical amplifier (e.g., a doped fiber amplifier, an erbium doped fiber amplifier, a Raman amplifier, etc.), an optical add-drop multiplexer ("OADM"), a reconfigurable optical add-drop multiplexer ("ROADM"), a flexibly reconfigurable optical add-drop multiplexer module ("FRM"), an optical source component (e.g., a laser source, or optical laser), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, Network elements 22 may include OADMs and/or ROADMs capable of being configured to add, drop, multiplex, and demultiplex optical signals. Network elements 22 may process and transmit optical signals to other network elements 22 throughout optical network 26 in order to deliver optical transmissions.

Layer 1 specific embodiments of the network element 22 may optionally be provided with additional elements that are not shown in the Figures such as an optical transceiver, a digital signal processor (DSP), and additional high-speed integrated circuit (ASIC or FPGA) that is specialized to handle high-speed data frames/packets.

Layer 0 specific embodiments of network element 22 may optionally be provided with additional elements that are not shown in the Figures such as a Wavelength Selective Switch (WSS), Variable Optical Attenuator (VOA), Erbium Doped Fiber Amplifier (EDFA), or Raman amplifiers, and optical channel monitors, for instance.

Figure 4:
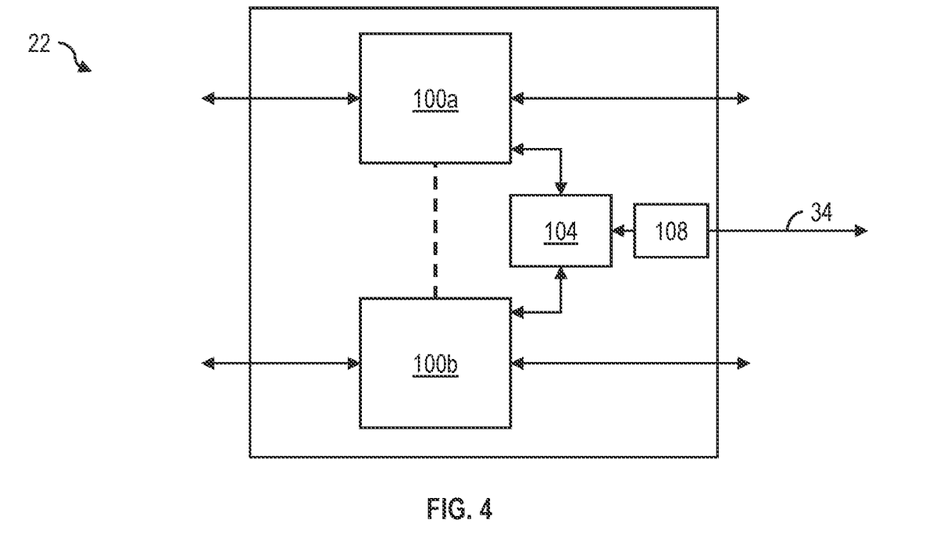
FIG. 4 is a diagrammatic view of an exemplary embodiment of a network element for use in the system of FIG. 1.

Referring now to FIG. 4, shown therein is a diagram of an exemplary embodiment of a node 22, such as the first node 22a and/or the second node 22b of FIG. 1, constructed in accordance with the present disclosure. The node 22 generally comprises an embedded device 100 (shown as embedded device 100a and embedded device 100b), a communication device 104 to allow one or more component of the node 22 to communicate to one or more other component of the node 22 or to another node 22 in the system 10 via the network 34, and a controller card 108.

In one embodiment, the embedded device 100 includes one or more digital coherent optics module having one or more coherent optical transceiver operable to receive a client data from an electrical signal and transmit the client data in an optical signal and/or receive the client data from an optical signal and transmit the client data in an electrical signal, or a combination thereof. In one embodiment, the embedded device 100 may include one or more of the Layer 1 elements and/or Layer 0 elements as detailed above. The embedded optical device may have one or more property affecting a function of the embedded device and one or more status indicative of a current state of at least one component of the embedded device.

In accordance with the present disclosure, the network element 22 may be a holder, like a chassis, or a contained/logical equipment, like an optical line card within the chassis. In one embodiment, the network element 22 may be a logical entity comprising one or more chassis having one or more pluggable cards (such as one or more embedded device 100 and/or one or more controller card 108) that form the network element 22. For instance, pluggable cards may include traffic carrying ("data plane") cards (e.g., embedded device 100) that may have customized silicon such as ASICs or FPGAs that process the data plane frames/packets, based on the functionality of the card. Another exemplary traffic carrying card is a router line-card which has packet processing ASICs or other specialized silicon. Another exemplary embedded device 100 is an optical line card that includes a DSP module and/or optical photonic circuits. Pluggable cards may also refer to control cards ("control and management plane") that don't process data packets but run all the software that implement the control plane (routing protocols) and management plane (management interfaces such as CLI, NETCONF, gRPC, DHCP etc.) such as the controller card 108. The control card 108 typically has an off-the-shelf CPU (such as Intel or ARM) and run some variant of an operating system (more recently, Linux or QNX or BSD), described below in more detail. Other embedded devices 100 include common cards that may also be added such as fan trays, power entry modules, and others that provide auxiliary functions of the chassis.

It should be noted that the diagram of the node 22 in FIG. 4 is simplified to include one controller card 108 in communication with multiple embedded devices 100. It is understood that the node 22 may include more than one controller card 108, and each controller card 108 may be in communication with one or more embedded device 100 via the same or a different communication device 104.

The number of devices illustrated in FIG. 4 is provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Figure 5:
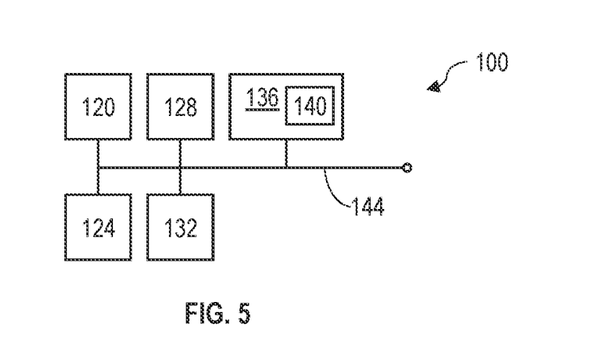
FIG. 5 is a diagrammatic view of an exemplary embodiment of an embedded device of FIG. 4.

Referring now to FIG. 5, shown therein is an exemplary embodiment of the embedded device 100 constructed in accordance with the present disclosure. In some embodiments, the embedded device 100 may include, but is not limited to, one or more input device 120 (hereinafter "input device 120"), one or more output device 124 (hereinafter "output device 124"), one or more processor 128 (hereinafter "processor 128"), one or more communication device 132 (hereinafter "communication device 132") operable to interface with the communication device 104, one or more non-transitory computer-readable medium 136 (hereinafter "memory 136") storing processor-executable code and/or software application(s) (such as a microservice 140, described below in more detail). The input device 120, output device 124, processor 128, communication device 132, and memory 136 may be connected via a path 144 such as a data bus that permits communication among the components of the embedded device 100.

The input device 120 may be capable of receiving client data and transmitting the client data to other components of the system 10. The input device 120 may include, but is not limited to, implementation as an optical network interface, an electrical network interface, combinations thereof, and/or the like, for example.

The output device 124 may be capable of outputting client data. For example, implementations of the output device 124 may include, but are not limited to, implementation as an optical network interface, an electrical network interface, combinations thereof, and/or the like, for example.

As used herein, any microservice 140 stored in the memory 136 and being executed by the processor 128 may be referred to as a device-level service or low-level service.

Figure 6:
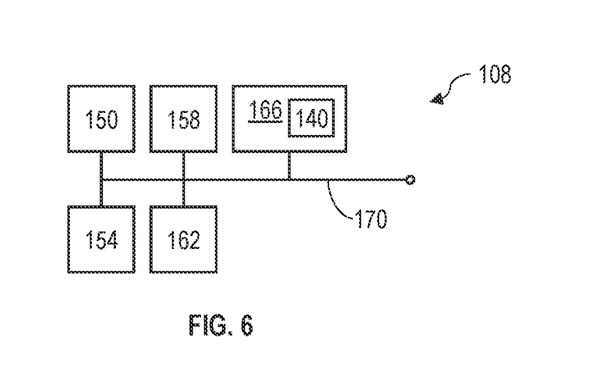
FIG. 6 is a diagrammatic view of an exemplary embodiment of a control card of FIG. 4.

Referring now to FIG. 6, shown therein is an exemplary embodiment of the controller card 108 constructed in accordance with the present disclosure. In some embodiments, the controller card 108 may include, but is not limited to, one or more input device 150 (hereinafter "input device 150"), one or more output device 154 (hereinafter "output device 154"), one or more processor 158 (hereinafter "processor 158"), one or more communication device 162 (hereinafter "communication device 162") operable to interface with the communication device 104, one or more non-transitory memory 166 (hereinafter "memory 166") storing processor-executable code and/or software application(s) (such as a microservice 140, described below in more detail). The input device 150, output device 154, processor 158, communication device 162, and memory 166 may be connected via a path 170 such as a data bus that permits communication among the components of the controller card 108.

The input device 150 may be capable of receiving client data and transmitting the client data to other components of the system 10. The input device 150 may include, but is not limited to, implementation as an optical network interface, an electrical network interface, combinations thereof, and/or the like, for example.

The output device 154 may be capable of outputting client data. For example, implementations of the output device 154 may include, but are not limited to, implementation as an optical network interface, an electrical network interface, combinations thereof, and/or the like, for example.

As used herein, any microservice 140 stored in the memory 166 and being executed by the processor 158 may be referred to as a node-level service or mid-level service.

The disclosure generally includes a plurality of microservices 140 distributed between various components of the system 10. The plurality of microservices generally include a core framework microservice 140a, a device microservice 140b, and a hardware entity microservice 140c. Additional microservices 140 may include a northbound microservice 140d and one or more supporting (or ancillary) microservice 140e, and/or the like. By arranging the plurality of microservices to execute on particular computing systems, such as the cloud-based server 30, embedded device 100, and controller card 108, a uniform management of distributed microservices that abide by a configuration/operational data/streaming communications model is fit within computing constraints of embedded devices 100 and/or controller card 108. Each of the microservices 140 relate to communications services provided by the node 22.

In one embodiment, the core framework microservice 140a comprises software (e.g., processor-executable instructions) that establishes the core framework microservice 140a as a "central gatekeeper", that is, the core framework microservice 140a is responsible for and manages inter-service message brokering and state management. The core framework microservice 140a may include a messaging service and a storage. In some embodiments, the messaging service may be gRPC (Google, LLC, Mountain View, Calif.). In some embodiments, the storage is a datastore, such as a data lake (described above), a database, a block of memory, and/or the like. In one embodiment, the core framework microservice 140a is one or more of a device-level service, a node-level service, and/or a cloud-level service. The core framework microservice 140a may maintain the system state. System state information may be partitioned by configuration or operational data and service type. Generally, microservices 140 are stateless, when starting up, system state information is either recovered directly from underlying hardware device layer or from the datastore of the core framework microservice 140a.

In one embodiment, the system state refers to a state of applied hardware configurations, such as, but not limited to, which optical links have been established and whether the optical links are operational or in a failed mode. Other system state information may include a state of the equipment, such as, but not limited to, whether the equipment is powered on or off. Additionally, each microservice 140 may one or more system state such as user accounts, passwords, authentication, permissions, and/or the like.

In one embodiment, the core framework microservice 140a manages configuration requests (described below and shown in FIG. 7) and associated notifications for operational data and streams made by northbound client entities via the northbound microservice 140d (described below and shown in FIG. 8). The core framework microservice 140a manages different classes of microservices using a uniform model, thereby ensuring that communication between microservices and the core framework microservice 140a is consistent and uses a known formatting, e.g., uses uniform semantics. Furthermore, because microservices 140 are independent of each other, all inter-microservice communication is distributed by the core framework microservice 140a, e.g., using event driven messaging services.

A northbound client entity is an entity or an agent representing a user of the system. That is, a user whose interests are in applying configurations (input) to the system, and receiving notifications from the system (output).

In one embodiment, the device microservice 140b is a classification of microservice that interfaces directly with device hardware. For example, device microservices 140b may provide an interface for a hardware entity microservice 140c (described below). In some embodiments, the device microservice 140b may be considered similar to an API for an embedded device. In one embodiment, the device microservice 140b must be run as a device-level service, that is, the device microservice 140b is stored in the memory 136 and executed by the processor 128. In one embodiment, the device microservice 140b subscribes for configuration requests and pushes operational data via the core framework microservice 140a. Operational data represents a state of hardware based on the device microservice 140b. The operational data is pushed to the core framework microservice 140a for distribution to any entity subscribed to this information, e.g., to northbound microservice 140d, or other microservices 140 that may be subscribed.

In one embodiment, the hardware entity microservice 140c is a hardware entity running on an embedded target that is managed by the device microservice 140b. In one embodiment, the hardware entity microservice 140c must be run as a device-level service, that is, the hardware entity microservice 140c is stored in the memory 136 and executed by the processor 128. In one embodiment, the hardware entity microservice 140c subscribes for configuration requests and pushes operational data via the core framework microservice 140a.

In one embodiment, the northbound microservice 140d is an external software client that is responsible for configuration and monitoring services being managed by the core framework microservice 140a. For example, in some embodiments, the northbound microservice 140d may collect, e.g., via the core framework microservice 140a, and aggregate data collected by one or more device microservice 140b from the hardware entity microservice 140c. In one embodiment, the northbound microservice 140d is one or more of a device-level service, a node-level service, and/or a cloud-level service. The northbound microservice 140d may receive one or more signal from the processor 58 of the user device 18. For example, the processor 58 of the user device 18 may cause the communication device 62 to transmit one or more signal via the network to the processor executing the northbound microservice 140d. In one embodiment, the northbound microservice 140d makes configuration requests and subscribes for notification updates via the core framework microservice 140a. In some embodiments, the northbound microservice 140d transmits a subscription request to the code framework microservice 140a in order to subscribe to one or more event of the core microservice framework.

In one embodiment, the one or more supporting (or ancillary) microservice 140e is a classification of microservice 140 that does not interact directly with embedded hardware, but do fulfill a business role in the system 10. An exemplary supporting microservice 140e may include an adapter microservice 140f operable to interface between a legacy software system running on an existing embedded device and the core framework microservice 140a, for example. In one embodiment, each of the one or more supporting microservice 140e is one or more of a device-level service, a node-level service, and/or a cloud-level service.

In one embodiment, each microservice 140 is compatible with standard container orchestration tools such as Docker Compose and Kubernetes. In this manner, the design of the core framework microservice 140a allow for horizontal scaling in a distributed system. In some embodiments, one or more of the microservices 140 uses secure containers, secure (TLS) connections, and/or the like.

Figure 7A:
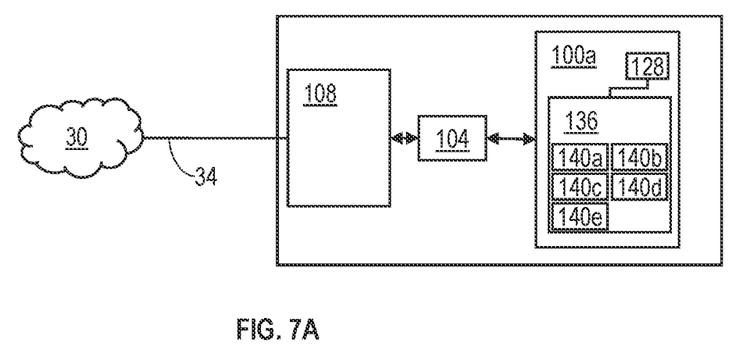
FIGS. 7A-C are diagrammatic views of exemplary embodiments of various deployment configurations.

In a first deployment scenario, shown in FIG. 7A, each of the plurality of microservices 140 are deployed on the embedded device 100. The first deployment scenario would require the maximum computer resources of the embedded system; however, in the first deployment scenario, each of the microservices would be able to interoperate with legacy software otherwise stored in the memory 136 and executed by the processor 128. In the first deployment scenario, the northbound microservice 140d is operating as a device-level service such that the user device 18 communicates with the embedded device 100, e.g., via the network 34.

Figure 7B:
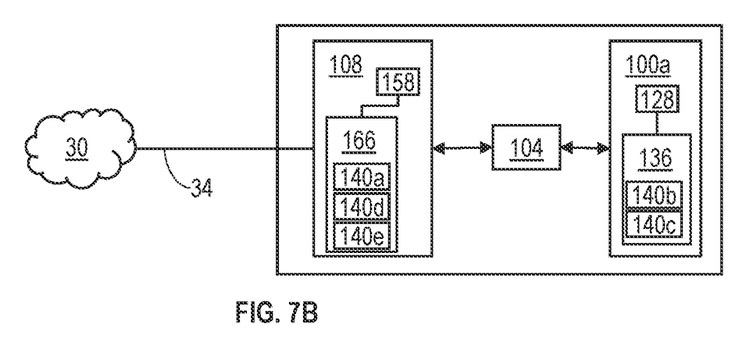

In a second deployment scenario, shown in FIG. 7B, each embedded device 100 stores in memory 136 the device microservice 140b and the hardware entity microservice 140c. The controller card 108 may then store, in the memory 166, and execute, via the processor 158, the core framework microservice 140a and one or more other microservice 140 such as the northbound microservice 140d and/or one or more supporting microservice 140e. In the second deployment scenario, the user device 18 may communicate with one or more controller card 108 executing the northbound microservice 140d. The controller card 108 may thus act as an interface, via the core framework microservice 140a, to the one or more embedded device 100. The second deployment scenario may minimize the amount of computing resources required of the embedded system and adds a redundancy capability when more than one controller card 108 is present in the node 22. When more than one controller card 108 is present in the node 22, if one controller card 108 fails, another of the more than one controller card 108 may be used to execute the code framework microservice 140a and the one or more other microservice 140.

Figure 7C:
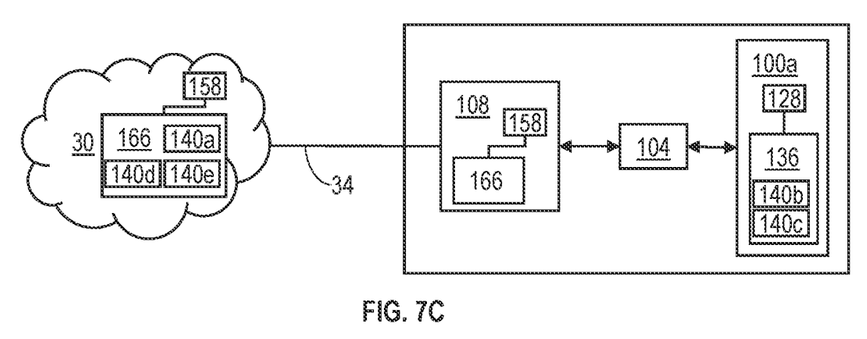

In a third deployment scenario, shown in FIG. 7C, each embedded device 100 stores in memory 136 the device microservice 140b and the hardware entity microservice 140c. The cloud-based server 30 may then store, in the memory 86, and execute, via the processor 88, the core framework microservice 140a and one or more other microservice 140 such as the northbound microservice 140d and/or one or more supporting microservice 140e. In the third deployment scenario, the user device 18 may communicate with cloud-based server 30 executing the northbound microservice 140d. The cloud-based server 30 may thus act as an interface, via the core framework microservice 140a, to the one or more embedded device 100, thereby bypassing the one or more controller card 108. The third deployment scenario may minimize the amount of computing resources required of the embedded system and reduces the need for node-based services or management systems.

The above three deployment scenarios are provided for exemplary purposes. The present disclosure is not limited to the three deployment scenarios above. As explained in more detail above, each microservice 140 may operate at one or more system level, e.g., as a device-level service, as a node-level service, and/or as a cloud-level service. Thus, any number of combinations of services may execute at one or more system level as previously described. For example, in some embodiments, microservices 140 may execute at each level, such as, the core framework microservice 140a and one or more other microservice 140 such as the northbound microservice 140d may execute as the cloud-level services, the one or more supporting microservice 140e may execute on the controller card 108 as a node-level service, and the device microservice 140b and the hardware entity microservice 140c may execute as a device-level service on the embedded devices 100.

Figure 8:
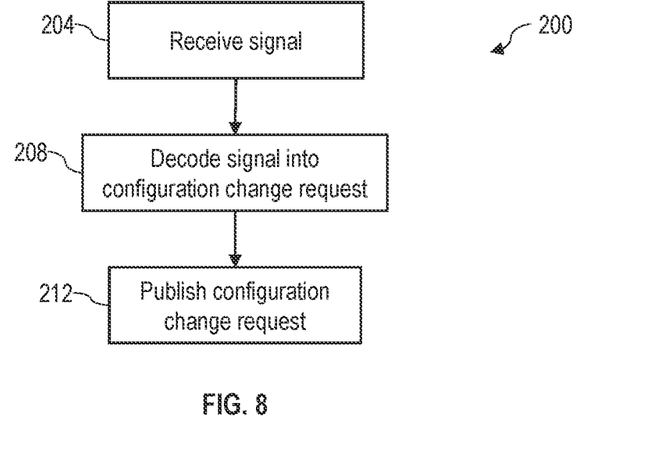
FIG. 8 is a process flow diagram of an exemplary embodiment of a framework configuration process in accordance with the present disclosure.

Referring now to FIG. 8, shown therein is a process flow diagram of a core framework configuration process 200 in accordance with the present disclosure. The core framework configuration process 200 is generally included in the computer executable instructions of the core framework microservice 140a and generally includes the steps of: receiving a signal (step 204); decoding the signal into a configuration request (step 208); and publishing the configuration request (step 212) to a particular one of the microservices 140.

In one embodiment, receiving a signal (step 204) comprises receiving the signal by the core framework microservice 140a. The core framework microservice 140a may receive the signal from any of the one or more microservices 140.

In one embodiment, receiving a signal (step 204) comprises receives a configuration signal having an encoded configuration. In some embodiment, the configuration signal is encoded with a messaging protocol. The messaging protocol may include gRPC. Additionally, in some embodiments, the configuration signal may be encoded based on the protobuf format, i.e., the protobuf encoding standard established by Google, LLC (Mountain View, Calif.). In one embodiment, the configuration signal encoded with the messaging protocol may be a short-lived remote procedure call.

In one embodiment, receiving a signal (step 204) comprises receiving a signal from a northbound microservice 140*d*. The northbound microservice 140*d* may be executed by a northbound agent.

In one embodiment, receiving a signal (step 204) comprises receiving the signal from any microservice 140 in communication with another microservice 140. For example, the supporting microservice 140*e*, in communication with the device microservice 140*b*, may send the signal to the core framework microservice 140*a*.

In one embodiment, receiving a signal (step 204) comprises verifying that the signal is from an authorized sender, e.g., that the sender has authorization to transmit the signal. In another embodiment, receiving a signal (step 204) comprises storing the signal in the datastore.

In one embodiment, decoding the signal into a configuration request (step 208) comprises decoding the signal having an encoded configuration, e.g., uniform configuration semantics, into a configuration request for a particular service.

In one embodiment, decoding the signal into a configuration request (step 208) comprises storing the decoded signal and/or configuration request in the datastore.

In one embodiment, publishing the configuration request (step 212) comprises notifying a particular microservice of the one or more microservice 140 that is subscribed to the core framework microservice 140*a* of the configuration request when that particular microservice is identified by the configuration request as a recipient of the configuration request. In one embodiment, publishing the configuration request (step 212) comprises publishing the configuration request as an event.

In one embodiment, publishing the configuration request (step 212) comprises notifying a particular set of microservices 140 of the one or more microservice 140 that are subscribed to the core framework microservice 140*a* of the configuration request when that particular set of microservices are identified by the configuration request as having a microservice classification corresponding to a recipient classification identified by the configuration request. For example, the core framework microservice 140*a* may publish the configuration request and notify one or more hardware entity microservice 140*c* of the configuration request, when the configuration request is targeting the one or more hardware entity microservice 140*c*. Other rules using lookup tables or the like may also be implemented to determine which microservices 140 are intended recipients of the configuration request.

In one embodiment, publishing the configuration request (step 212) comprises storing the published configuration request in the datastore.

Figure 9:
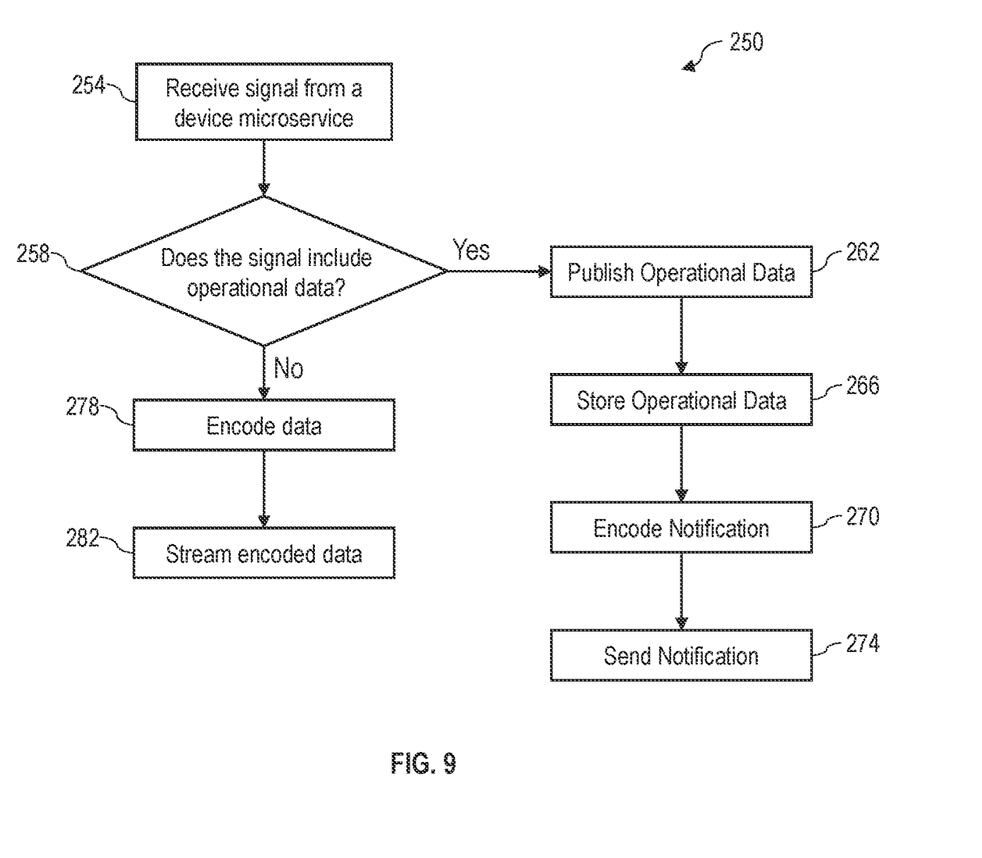
FIG. 9 is a process flow diagram of an exemplary embodiment of a data flow process in accordance with the present disclosure.

Referring now to FIG. 9, shown therein is a process flow diagram of an exemplary embodiment of a data flow process 250 in accordance with the present disclosure. The data flow process 250 is generally included in the computer executable instructions of the core framework microservice 140*a* and generally includes the steps of: receiving a signal from a microservice (step 254); determining if the signal includes operational data (step 258); if the signal includes operational data then publishing the operational data (step 262); storing the operational data (step 266); encoding a notification (step 270); and sending the notification (step 274); and if the signal does not include operational data, encoding data from the signal (step 278); and streaming the encoded data (step 282).

In one embodiment, receiving the signal from the microservice (step 254) includes receiving the signal wherein the signal includes a data having a data type. The data type may include, for example, operational data and stream data. The data may include one or more information about one or more component of the node running the microservice. For example, the signal may comprise data including a programmed state of the embedded device and a data type of operational data; data including one or more alarm (e.g., from an alarm signal) and a data type of stream data; and/or data including performance monitoring and measurements with a data type of stream data, and/or the like, for example.

In one embodiment, receiving a signal from the microservice (step 254) includes receiving the signal from a device-level service, e.g., a microservice operating on the embedded device as described above.

In one embodiment, receiving a signal from the microservice (step 254) includes receiving the signal from the device microservice 140*b* and/or the hardware entity microservice 140*c*.

In one embodiment, determining if the signal includes operational data (step 258) includes checking the data type of the data in the signal.

In one embodiment, determining if the signal includes operational data (step 258) includes determining if the data type of the signal is an operational data type.

In one embodiment, if the signal includes operational data (e.g., the signal is an operational signal), then publishing the operational data (step 262) comprises publishing the operational data to any service that has subscribed to the operational data type. In some embodiments, publishing the operational data includes publishing the data to any service that has subscribed to operational data from a particular embedded device and/or node.

In one embodiment, storing the operational data (step 266) includes storing the operational data in a memory associated with the processor executing the data flow process 250. For example, if the data flow process 250 is operating as a node-level service, the operational data may be stored in the memory 166 and/or in a database or other data store within the memory 166; however, if the data flow process 250 is operating as a device-level service, the operational data may be stored in the memory 136.

In one embodiment, storing the operational data (step 266) includes transmitting the operational data to a service running in the cloud-based server 30 via the network 34, for example. The cloud-based server 30 may store the operational data in the memory 86 such as in the database 82. In some embodiments, prior to transmitting the operational data to the service, the operational data is encoded and the encoded operational data is transmitted to the service.

In one embodiment, encoding a notification (step 270) includes encoding the data received with the protobuf encoding standard. Encoding the notification may further include formatting the data into a notification for transmittal via a messaging protocol such as gRPC, for example.

In one embodiment, encoding a notification (step 270) includes encoding a notification with the protobuf encoding standard and formatting the notification for transmittal via a messaging protocol such as gRPC, wherein the notification includes an indicator that operational data has been received and has been persisted into a datastore.

In one embodiment, encoding a notification (step 270) includes encoding a notification indicative of a change in the data store.

In one embodiment, sending the notification (step 274) includes sending the notification to one or more service that has subscribed to the particular notification. For example, sending the notification may include sending the notification to one or more microservice that may be dependent on the microservice that sent the received signal from step 254. For example, if a first service is dependent on a second service in order to operate correctly, the first service may receive a notification, via the data flow process 250, indicative of a change in the data store when the second service transmits a signal having operational data to the core framework microservice.

In one embodiment, sending the notification (step 274) includes sending the notification to a northbound agent that is subscribed to the particular notification. In one embodiment, the notification may be a long-lived subscription.

If the signal does not include operational data, the data flow process 250 continues to encoding data from the signal (step 278).

In one embodiment, encoding data from the signal (step 278) includes encoding the received data with the protobuf encoding standard. Encoding the data may further include formatting the received data into an encoded data stream for transmittal via a messaging protocol such as gRPC, for example.

In one embodiment, encoding data from the signal (step 278) includes encoding the received data inro an encoded data stream.

In one embodiment, streaming the encoded data (step 282) may include, for example, streaming the encoded data to one or more microservice 140 subscribed to the data stream. Streaming the encoded data may be a long-lived subscription.

In one embodiment, streaming the encoded data (step 282) may include, for example, raising an event indicative of the encoded data as a data stream thereby alerting one or more microservice 140 subscribed to the particular event to attach to and stream the data.

The received data may thus be streamed from the hardware entity microservices 140c to the device microservice 140b, through the core framework microservice 140a to one or more northbound microservice 140d subscribed to the data stream. The stream data may include, example, alarms generated by the one or more hardware entity microservice 140c of the embedded device (e.g., an alarm stream) or a status signal, for example, performance monitoring and management data of the one or more hardware entity microservice 140c of the embedded device. Monitoring and/or management data may include one or more status indicative of a current state of at least one component of the embedded device, such as, for example, a temperature, a voltage, an optical power, a transmission capacity, a processor load, a memory load, and a communication device load, or other measurable state of one or more component of the embedded device, and/or the like, for example. In this way, the user device 18 may see a consistent view of the underlying system (e.g., embedded devices 100/nodes 22) via notifications and streams, whether the underlying system is a current generation system or a legacy system.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element node, comprising:
   an embedded device having one or more property affecting a function of the embedded device and one or more status;
   a first computing system having a first processor and a first memory, the first memory being a first non-transitory computer-readable medium storing a device microservice and a hardware entity microservice, the hardware entity microservice in communication with the embedded device;
   a second computing system having a second processor and a second memory, the second memory being a second non-transitory computer-readable medium storing a core framework microservice; and
   a communication device in communication with the first computing system and the second computing system;
   wherein the device microservice is processor-executable code that when executed causes the first processor to:
   receive a configuration request from the core framework microservice; and
   implement the configuration request on the hardware entity microservice to affect the one or more property of the embedded device; and
   wherein, the core framework microservice is processor-executable code that when executed causes the second processor to:
   receive a configuration signal having an encoded configuration;
   decode the configuration into a configuration request; and
   transmit the configuration request to the device microservice;
   wherein the processor-executable code that when executed causes the first processor to:
   receive, via the hardware entity microservice, one or more alarm from the embedded device; and
   transmit, via the communication device, an alarm signal to the core framework microservice, the alarm signal indicative of the one or more alarm of the embedded device; and
   wherein, the core framework microservice is processor-executable code that when executed causes the second processor to:
   receive the alarm signal from the device microservice, the alarm signal indicative of the one or more alarm of the embedded device;
   encode the one or more alarm of the embedded device into an encoded data stream; and
   publish the encoded data stream.

2. The network element node of claim 1, wherein the configuration signal is a remote procedure call.

3. The network element node of claim 2, wherein the remote procedure call is a gRPC call encoded with the protobuf format.

4. The network element node of claim 1, wherein the first computing system is integrated into the embedded device.

5. The network element node of claim 1, wherein the second computing system is integrated into a controller card.

6. The network element node of claim 1, wherein both the first computing system and the second computing system are integrated into the embedded device.

7. The network element node of claim 1, wherein the device microservice is processor-executable code that when executed causes the first processor to:
- retrieve, via the hardware entity microservice, the one or more status of the embedded device; and
- transmit, via the communication device, a status signal to the core framework microservice, the status signal indicative of the one or more status of the embedded device; and
- wherein, the core framework microservice is processor-executable code that when executed causes the second processor to:
  - receive the status signal from the device microservice, the status signal indicative of the one or more status of the embedded device;
  - encode the one or more status of the embedded device into an encoded data stream; and
  - publish the encoded data stream.

8. The network element node of claim 7, wherein the core framework microservice, when executed, further causes the second processor to:
- receive a subscription request from a northbound microservice; and
- in response to the subscription request being a request for the encoded data stream, stream the encoded data stream to the northbound microservice.

9. The network element node of claim 8, wherein the communication device is a first communication device, and further comprising:
- a second communication device in communication with the second processor and a network;
- wherein the core framework microservice, when executed, further causes the second processor to:
  - receive a subscription request from the northbound microservice via the second communication device, the northbound microservice communicating with the second communication device via the network.

10. The network element node of claim 9, wherein the network is the Internet.

11. The network element node of claim 1, wherein the core framework microservice, when executed, further causes the second processor to:
- after receiving the configuration signal having the configuration request, verify authorization to provide the configuration request based on the configuration signal.

12. The network element node of claim 1, wherein the embedded device is one or more of a Layer 1 or Layer 0 device.

13. The network element node of claim 1, wherein the embedded device is a digital coherent optics module having one or more coherent optical transceiver operable to transmit and/or receive a client data in an optical network.

14. The network element node of claim 1, wherein the first processor is one or more of a digital signal processor (DSP), an application specific integrated circuit (ASIC), a field programmable gate array (FPGA), a microprocessor, and a central processing unit (CPU).

15. The network element node of claim 1, wherein the embedded device is one or more of a Wavelength Selective Switch (WSS), a Variable Optical Attenuator (VOA), an Erbium Doped Fiber Amplifier (EDFA), an optical laser, a Raman amplifier, and an optical channel monitor.

16. The network element node of claim 1, wherein the one or more status of the embedded device includes one or more temperature, voltage, optical power, transmission capacity, processor load, memory load, and communication device load.

17. The network element node of claim 1, wherein the device microservice is processor-executable code that when executed causes the first processor to:
- retrieve one or more operational data from the first memory, operational data being a programmed state of the embedded device; and
- transmit, via the communication device, an operational signal to the core framework microservice, the operational signal indicative of the one or more operational data of the embedded device; and
- wherein, the core framework microservice is processor-executable code that when executed causes the second processor to:
  - receive the operational signal from the device microservice, the operational signal indicative of the one or more operational data of the embedded device;
  - encode the one or more operational data of the embedded device into an encoded operational data; and
  - publish the encoded operational data to a datastore.

18. The network element node of claim 17, wherein the core framework microservice is processor-executable code that when executed causes the second processor to:
- generate one or more notification indicative of a change to the operational data in the datastore; and
- publish the notification such that one or more northbound microservice subscribed to receive the notification indicative of the change to the operational data of the embedded device can retrieve the notification.

* * * * *